US008587449B2

(12) United States Patent
Ramones et al.

(10) Patent No.: US 8,587,449 B2
(45) Date of Patent: Nov. 19, 2013

(54) WIDE VIEWING ANGLE INDICATORS FOR NETWORK DEVICES

(75) Inventors: John Kui Yin Ramones, San Ramon, CA (US); Laura Elizabeth Bucholtz, San Francisco, CA (US); Chadwick John Harber, San Francisco, CA (US); Gadi Amit, San Mateo, CA (US); Julien Rouillac, San Francisco, CA (US)

(73) Assignee: Netgear, Inc., San Jose, CA (US)

( * ) Notice: Subject to any disclaimer, the term of this patent is extended or adjusted under 35 U.S.C. 154(b) by 1070 days.

(21) Appl. No.: 12/554,281

(22) Filed: Sep. 4, 2009

(65) Prior Publication Data

US 2011/0057780 A1 Mar. 10, 2011

(51) Int. Cl.
*G08B 5/00* (2006.01)
(52) U.S. Cl.
USPC ........................................ 340/815.4; 370/342
(58) Field of Classification Search
USPC .................... 340/815.4, 540, 815.43, 815.55; 370/342
See application file for complete search history.

(56) References Cited

U.S. PATENT DOCUMENTS 7,190,268 B1 * 3/2007 Rad et al. ...................... 340/540

* cited by examiner

*Primary Examiner* — Shirley Lu
(74) *Attorney, Agent, or Firm* — James M. Wu; JW Law Group (57) ABSTRACT

A network device and method for improving performance monitoring capabilities using wide view angle indicators are disclosed. A network device, in one embodiment, includes a first plate, a second plate, and a light source. The first plate has multiple performance indicators situated at a side of the network device. The second plate has multiple performance indicators wherein the second plate is situated at a surface having a predefined angle with respect to the first plate. The light source, which includes at least one light emitting diode ("LED") and optical element(s), is capable of generating two illuminating beams. The first illuminating beam illuminates a portion of device performance viewable from the first plate and the second illuminating beam illuminates a first portion of device performance viewable from the second plate.

4 Claims, 11 Drawing Sheets

WIDE VIEWING ANGLE INDICATORS FOR NETWORK DEVICES

RELATED APPLICATIONS

This application is related to the following co-pending application, which has assigned to the Assignee of the present invention.
a. application Ser. No. 29/343,072, filed Sep. 4, 2009, entitled "WIDE VIEWING ANGLE INDICATORS FOR NETWORK DEVICES."

FIELD

The exemplary embodiment(s) of the present invention relates to network systems. More specifically, the exemplary embodiment(s) of the present invention relates to performance indicators for network devices.

BACKGROUND

A high-speed network environment typically includes network devices such as routers and switches used for facilitating delivery of information packets and/or data traffic from source devices to destination devices via communication networks such as IP and/or packet-based networks. Information pertaining to the transfer of data packet(s) and/or frame(s) through the network(s) is usually embedded within the packet and/or frame itself. Each packet, for instance, traveling through multiple nodes via one or more communication networks such as Internet and/or Ethernet can typically be handled independently from other packets in a packet stream or traffic. Each node which may include routing, switching, and/or bridging engines processes incoming packet(s) or frame(s) and determines where the packet(s) or frame(s) should be forwarded.

A typical modern local area network ("LAN") includes various types of network such as a home area network ("HAN"), a residential LAN, and/or a network gateway used for connecting multiple network devices within an enclosure like a building or home. Devices can be computers, printers, Internet connections, servers, televisions, gaming units, and the like. With increasing popularity of home networking and triple play services (voice, video and data), high-speed computing network devices for handling information such as IPTV (Internet Protocol Television) are in demand. A network switch for HAN, for example, can operate over existing wiring, such as coax cables or power lines, for transmitting network information.

With increasing capabilities of a typical network device, managing and monitoring network performance have become increasingly difficult. A problem associated with a typical network device is limited viewing and/or monitoring performance of functional icons on the device. For example, current LED indicators are typically shown on one vertical surface by illuminating a functional icon which has limited viewing angle. When a user moves toward the device (router or switch), the illuminated icon becomes acute or difficult to observe.

SUMMARY

A device and method for improving performance monitoring capabilities using wide view angle indicators are disclosed. A device includes a network device, a multimedia device, a handheld device, a gaming device, and the like. The device, in one embodiment, includes a first plate, a second plate, and a light source. The first plate has multiple performance indicators situated at a side of the network device. The second plate has multiple performance indicators wherein the second plate is situated at a surface having a predefined angle with respect to the first plate. The light source, which includes at least one light emitting diode ("LED") and optical element(s), is capable of generating two illuminating beams. The first illuminating beam illuminates a portion of device performance viewable opposite from the first plate and the second illuminating beam illuminates a first portion of device performance viewable opposite from the second plate.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and apparatus of improving performance monitoring using wide angle viewing capabilities.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items A network device such as a switch or a router includes a first plate, a second plate, and a light source. The first plate has multiple performance indicators situated at one side of the network device. The second plate has multiple performance indicators wherein the second plate is situated at a surface having a predefined angle with respect to the first plate. The performance indicators on the first plate, in one embodiment, are the same indicators as the performance indicators on the second plate. The light source or apparatus, which includes at least one light emitting diode ("LED") and optical element(s), is capable of generating two illuminating beams. Optical elements, including optical lens, optical panel(s), optical channel, are capable of directing, converting, and splitting optical light. The first illuminating beam illuminates a portion of device performance viewable opposite from the first plate and the second illuminating beam illuminates a first portion of device performance viewable opposite from the second plate. The term "viewable opposite from the first plate" means that a user or observer directly or indirectly faces the first plate and sees the light illuminating from the first plate. Similarly, the term "viewable opposite from the second plate" has the similar meaning as the term "viewable opposite from the first plate."

Figure 1:
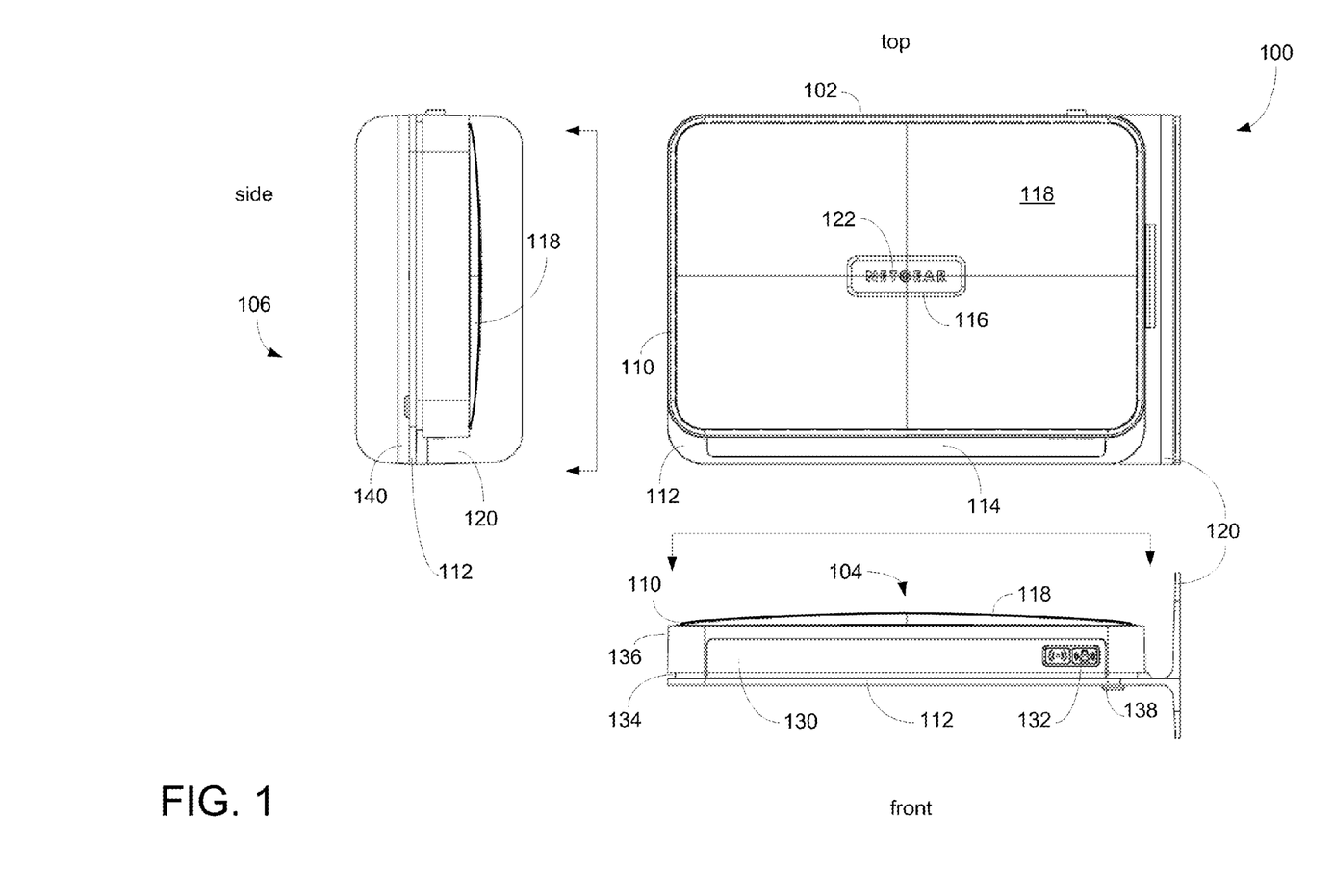
FIG. 1 is a two-dimensional ("2D") diagram illustrating a structural layout of a network device having a wide viewing angle for performance management in accordance with one embodiment of the present invention.

FIG. 1 is a two-dimensional ("2D") diagram 100 illustrating a structural network device having a wide viewing angle for displaying device status in accordance with one embodiment of the present invention. Diagram 100 illustrates a top view 102, a front view 104, and a side view 106 of the device. Side view 106, in one example, shows the device in a standing orientation while front view 104 shows the device in a desktop or horizontal orientation. Diagram 100 essentially illustrates a structural enclosure or case with a removable stand 120 wherein the case is configured to house a network device, such as a switch, router, wireless gateway, hub, bridge, and the like. It should be noted that the underlying concept of the exemplary embodiment(s) of the present invention would not change if one or more elements were added to or removed from diagram 100.

Top view 102 of the device includes a cover 118, a removable stand 120, and a lip 112, wherein lip 112 further includes a first plate or an icon plate 114. Cover 118, which can also be called a top lid, top side, et cetera, includes a logo area 122, a top vent 116, and an edge vent 110. While vents 110 and 116 provide a cooling function for heat dissipation, logo area 122 facilitates or hosts a trader mark logo such as NETGEAR™. It should be noted that logo area 122, which is currently located at the center top section, can be moved anywhere on the case. Icon plate 114, in one embodiment, indicates device performance using various performance icons or indicators with partial diffused illumination areas.

For example, icon plate 114 includes an on-off icon, "2.4 GHz" icon, "5 GHz", "1" icon, "2" icon, "3" icon, "4" icon, and so on. While 2.4 GHz and 5 GHz icons indicate the speed of the data transmission, 1-4 icons, for example, indicate the status of network connections. Each icon may have at least one associated light source, wherein activities of light beams generated by the light source indicate the status or performance of the associated icon. For instance, when the light beam associated with "2" icon is lit, it indicates that the network connection or channel 2 connection is active or connected. In addition, if the light beam(s) associated with 2.4 GHz is blinking or flashing, it indicates that the current data transmission is 2.4 billion cycles per second.

Front view 104 of the device shows a front viewing perspective including cover 118, edge vent 110, wall 136, stand 120, lip 112, and a front icon plate 130. Similar to icon plate 114, front icon plate 130, in one embodiment, indicates device performance using various status icons with partial diffused illumination areas. Front icon plate 130 also includes one or more switches 132 used to turn on and/or off the device. Front view 104 of the device further includes an optical channel 134 and an interlock element 138. Channel 134, in one embodiment, is situated between lip 112 and front icon plate 130 for guiding and facilitating diffused illumination generated by optical beams. Interlock element 138 can be a lock or an anchoring system used for fastening or attaching removable stand 120 to the device whereby the device can be placed in a more desirable orientation.

Side view 106 of the device shows a side viewing perspective having cover 118, stand 120, and a bottom side 140, wherein bottom side 140 includes an edge or lip 112. Side view 106 can also be viewed as a top view when the device is in vertical or standing position. It should be noted that cover 118 has a parabolic curve, which provides aesthetic appearance as well as functional application(s). A functional application, for instance, can be heat dissipation. For example, when the device is in horizontal or desktop position, the heat generated by various internal components accumulates at the tip of parabolic curve of cover 118 whereby top vent 116 can dissipate heat or hot air via its openings.

Icon plate 114 is situated at one side of device and front icon plate 130 is situated at a surface having a predefined angle with respect to icon plate 114. The predefined angle, in one example, is 90 degree. Alternatively, the predefined angle can have an angle any where between 10 degree and 170 degree. In one embodiment, the plates are structured by transparent or semitransparent optical materials capable of facilitating one or more diffused illumination areas for performance indicators. The performance indicators on both plates may be the same indicators.

The light source, in one embodiment, guided by an optical guiding channel, generates a first illuminating beam and a second illuminating beam, wherein the first illuminating beam illuminates a first portion of device performance viewable opposite from the first plate (or icon plate) 114 and the second illuminating beam illuminates a first portion of device performance viewable opposite from the second plate (or front icon plate) 130. The device can include a second light source which is also capable of generating two illuminating beams, wherein the first illuminating beam of the second light source illuminates a second portion of device performance viewable opposite from the first plate and the second illuminating beam of the second light source illuminates a second portion of device performance viewable opposite from the second plate.

The optical guiding channel creates a groove between the first plate and the second plate. An optical diffuser, coupled with the optical guiding channel, is configured to generate at least one area of diffused illumination in response to light generated by the first light source. A removable stand 120 is able to attach itself to a third side of the network device for facilitate placing the network device in a vertical position.

An advantage of using the embodiment(s) of the illustrated device is to enhance device capabilities for performance monitoring and/or displaying with wide viewing angles.

Figure 2A:
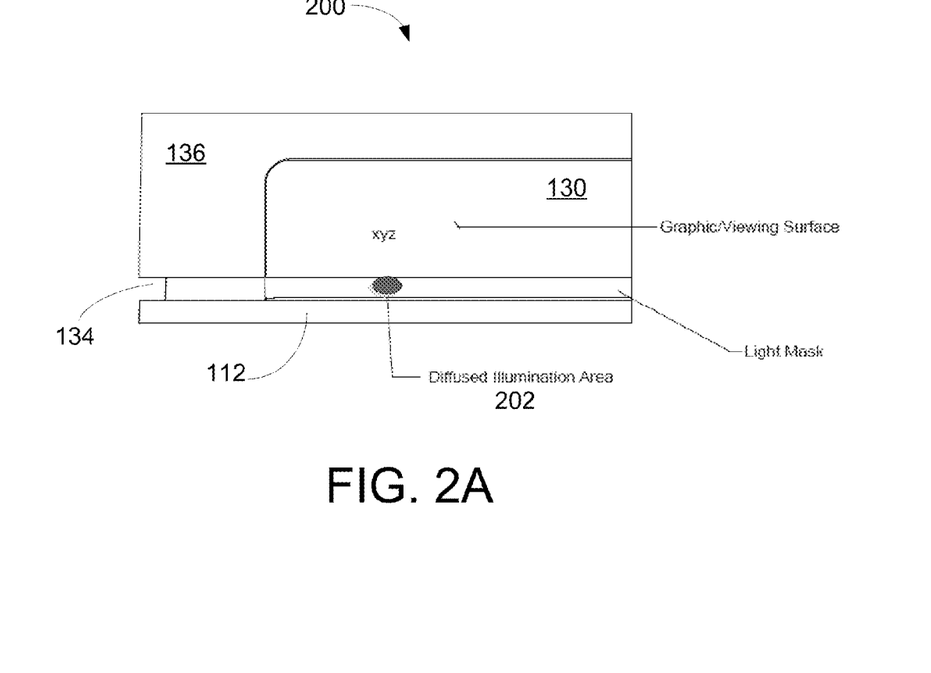
FIG. 2AB illustrate portions network device having diffused illumination areas in accordance with one embodiment of the present invention.

FIG. 2A illustrates a portion of front view for a network device 200 having a diffused illumination area in accordance with one embodiment of the present invention. Device 200 includes wall 136, optical channel 134, lip 112, and diffused illumination area 202, wherein wall 136 can also be referred to as a side of housing. Diffused illumination area 202 is generated by a light source, not shown in FIG. 2A, and is viewable opposite from wall 136. It should be noted that the underlying concept of the exemplary embodiment(s) of the present invention would not change if one or more elements were added to or removed from diagram 200.

Wall 136, in one embodiment, includes a front icon plate 130 which is a graphic/viewing surface having one or more icons. Icons, which are also known as markers or indicators, are used to indicate device status or performance when the associated diffused illumination areas are activated. For example, when diffused illumination area 202 is lit or activated, it indicates that network connection "xyz" is active.

Optical channel 134 is formed between lip 112 and wall 136 used for guiding the light beam(s). Optical channel 134, in one embodiment, includes a light mask which is capable of creating and/or facilitating one or more diffused illumination areas. The diffused illumination areas associated with icon(s) on icon plate 130 are viewable opposite from front icon plate 130. A light mask is used to collimate optical light to a specific or predefined area and also control and/or prevent light spreading to other portions of the graphical viewing interface.

Figure 2B:
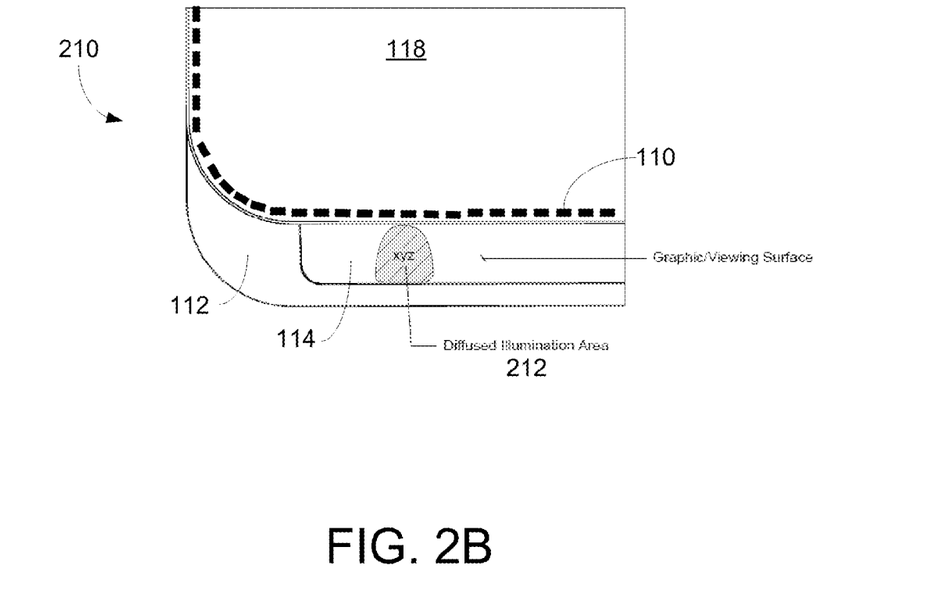

FIG. 2B illustrates a portion of top view of network device 210 having a diffused illumination area in accordance with one embodiment of the present invention. Device 210 includes cover 118, edge vent 110 with a pattern, lip 112, and a diffused illumination area 212. Diffused illumination area 212 is generated by a light source, not shown in FIG. 2B, and is viewable opposite from lip 112. Edge vent 110 situated at the edge of cover 118 provides heat dissipation for temperature control. In one embodiment, FIG. 2B illustrates a top view of device shown in FIG. 2A.

Lip 112, which is also known as an edge of a bottom side, includes icon plate 114 which is a graphic/viewing surface having one or more icons. Icons, which are also known as markers or indicators, are used to indicate device status or performance when the associated diffused illumination areas are activated. For example, when diffused illumination area 212 is lit or activated, it indicates that network connection "xyz" is active.

Optical channel 134 is situated between lip 112 and wall 136 for guiding the light beam(s) to create diffused illumination area(s). Icon plate 114, in one example, is capable of facilitating one or more diffused illumination areas, wherein the diffused illumination areas are viewable opposite from icon plate 114. In one example, icons "xyz" on front icon plate 130 and icon plate 114 represent the same network connection, and diffused illumination areas 202 and 212 are generated by a single light source or LED.

Lip 112 is an extended edge, which is substantially perpendicular to front icon plate 130, and houses icon plate 114 to enhance the viewing angle of diffused illumination areas. Large viewing angle enhances performance monitoring capabilities by a user or an administrator. Marker or indicator as printed graphic function allows light generated by an LED to be seen from straight on (or zero degree viewing angle). It should be noted that performance of a function is indicated by illumination of an LED in close proximity to its respective functional icon or marker. Network device 200 or 210 uses light such as diffused illuminations to project directly or indirectly onto angled graphic surfaces 114 and 130 for performance monitoring by a user.

Present embodiment(s) of the device allows a user or network administrator to view status indicators over a wide angle with multiple orientations by using two indicator surfaces of indirect lighting. A first surface is a printed graphic surface and a second surface is an angled printed graphic surface. In one example, the first surface is in close proximity to a light source while the second surface is lit by the same light source. Note that an application of the present embodiment is applicable to desktop products used for network processing as well as standing products.

Figure 3A:
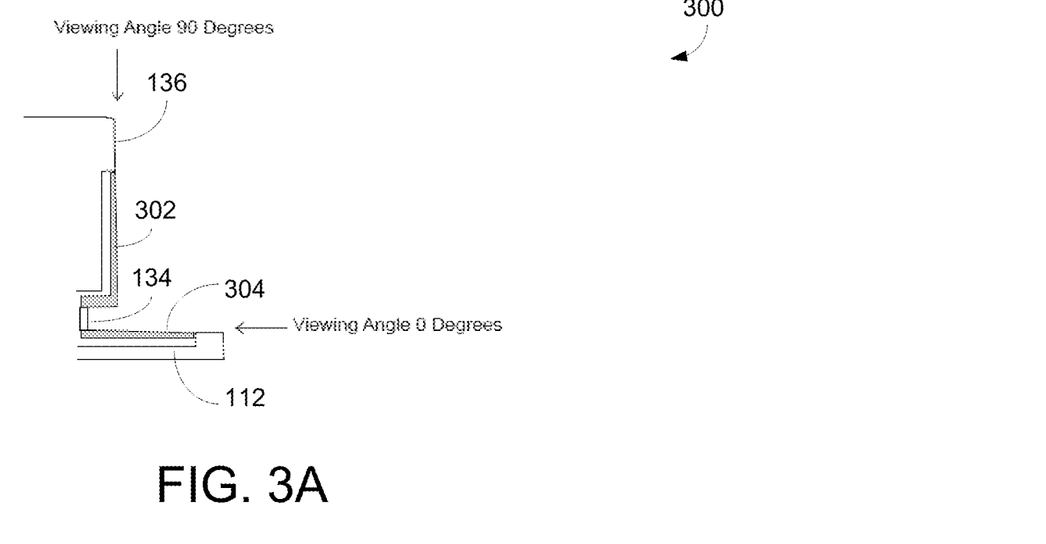
FIG. 3AB are cross-section diagrams illustrating diffused illumination areas in accordance with one embodiment of the present invention.
Figure 3B:
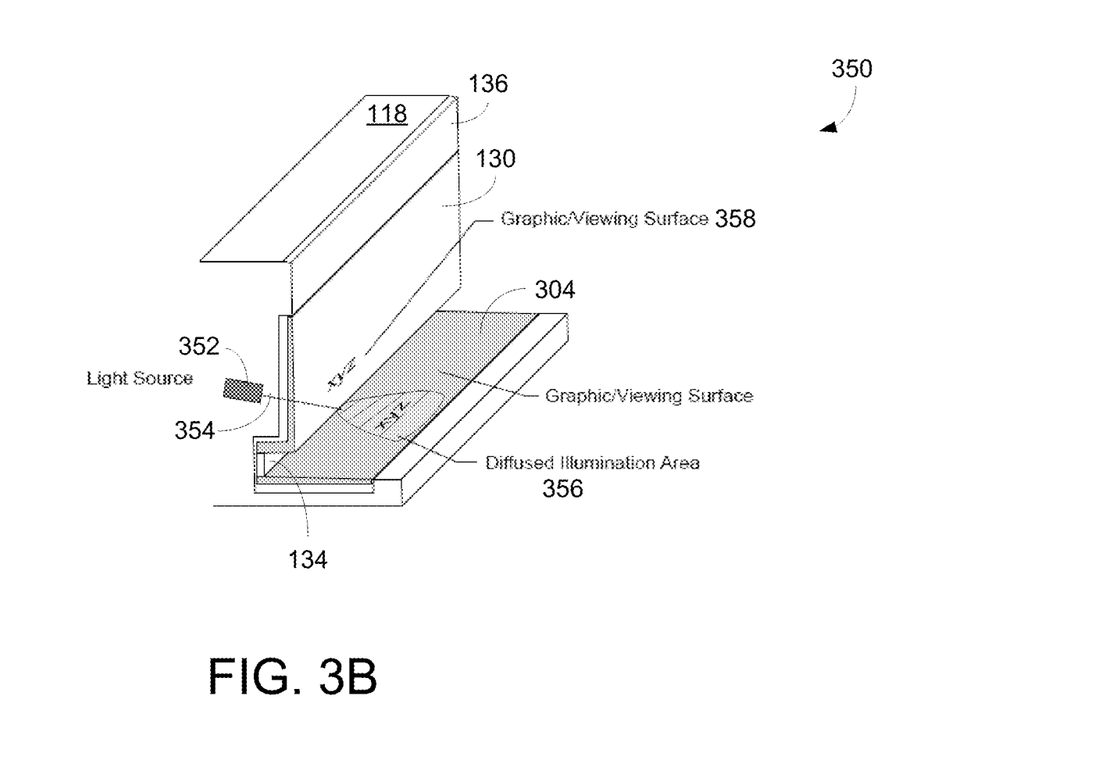

FIG. 3A is a cross-section diagram 300 showing sectional view of a network device illustrating a diffused illumination area in accordance with one embodiment of the present invention. FIG. 3B is a three-dimensional ("3D") diagram 350 showing sectional views of a network device shown in diagram 300 in accordance with one embodiment of the present invention. Diagram 300 shows wall 136, optical channel 134, and lip 112 wherein wall 136 further includes a graphic viewing surface 302 while lip 112 includes a second graphic viewing surface 304. Graphic viewing surfaces 302-304 are used to facilitate one or more diffused illumination areas. It should be noted that the underlying concept of the exemplary embodiment(s) of the present invention would not change if one or more elements were added to or removed from diagrams 300 or 310.

Diagram 350 further illustrates cover 118, light source 352 emitting a light beam 354, and diffused illumination area 356. Lighting source 352 may include LED, lens, and the like. To generate diffused illumination area 356, various optical elements and materials are used to initiate and control light beams with sufficient space between them. For example, graphic viewing surface 302 or 304 may be made by a specific optical material to collimate light beam(s) thereby a predefined diffused illumination area can be properly achieved.

In operation, diffused illuminations or lighting indicators are lit on a vertical surface or front icon plate by illuminating a functional icon with certain viewing angle. As a user or administrator moves toward or away from the device, the viewing angle becomes more acute. The present embodiment(s) of the invention provides a device having a wide viewing angle to enhance performance monitoring. It should be noted that a vertical graphical indicating surface and a second angled graphical indicating surface are lit by a single LED. The graphical indicating surfaces, however, do not need to be orthogonal, nor vertical and horizontal. A desirable angled surface can be formed based on specific applications.

For a desktop product or device, a user's viewing point, for example, is above the device. When the user moves closer to the device, for example, the user's vantage point is higher above the product and cuts down readability of front panel indicators as the viewing angle becomes more acute. The advantage of the embodiment(s) of present invention is to allow a greater than 90 degree continuous viewing angle. User or users can obverse device status or performance from a horizontal orientation to a vertical orientation. It should be noted that the embodiment of the present invention allows the product or device to be placed horizontally or vertically on a desk.

Figure 4A:
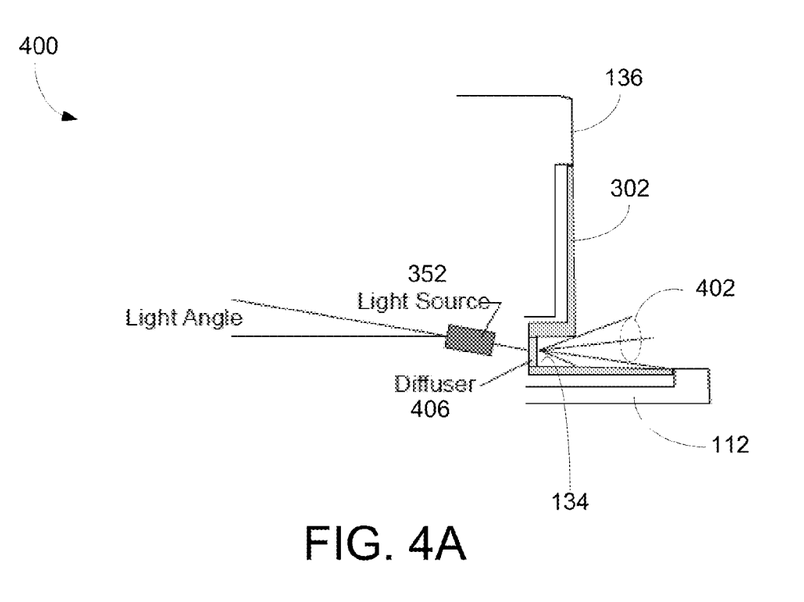
FIG. 4AB are cross-section diagrams illustrating light beams generated by a light source in accordance with one embodiment of the present invention.
Figure 4B:
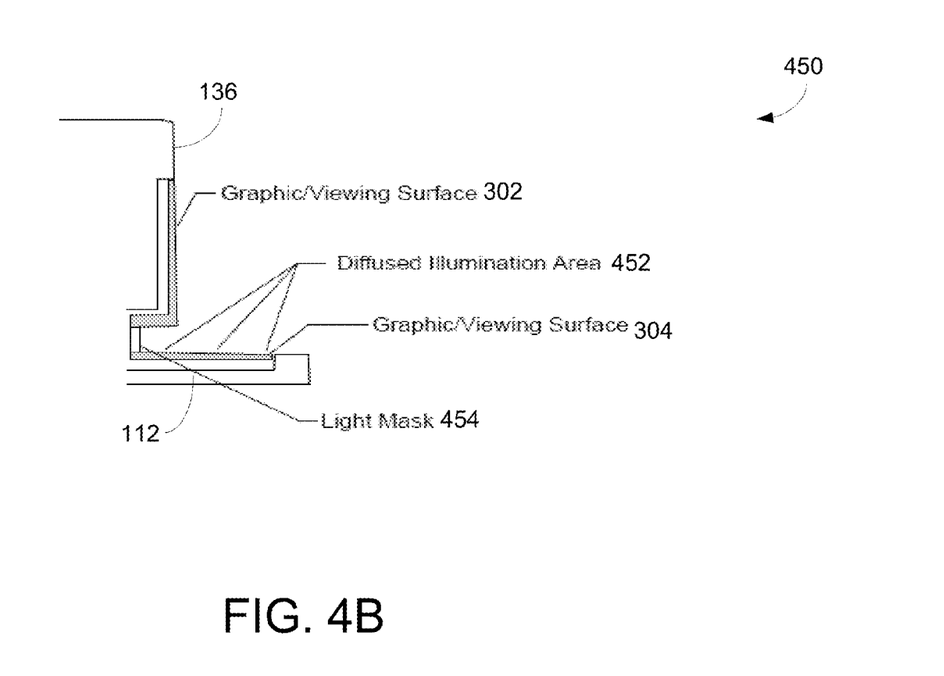

FIG. 4A is a cross-section diagram 400 illustrating light beams generated by a light source in accordance with one embodiment of the present invention. Diagram 400 shows wall 136, lip 112, and a light source 352 with a diffuser 406. Depending on the position of light source 352, a light beam with predefined collimation 402 can be formed when optical light passes through diffuser 406. The viewing angle of the lighting generated by light source 352 is also controlled or confined by optical channel 134. FIG. 4B illustrates graphic viewing surface 304 used to optically deflect diffused illumination 452 when the optical beam(s) passes through light mask 454 and strikes on the surface of graphic viewing surface 304. Depending on the applications, different optical materials may be used for graphic view surfaces for different applications. A diffusing surface is applied to the front of a light mask for providing greater light projection to horizontal graphic viewing areas.

Figure 5A:
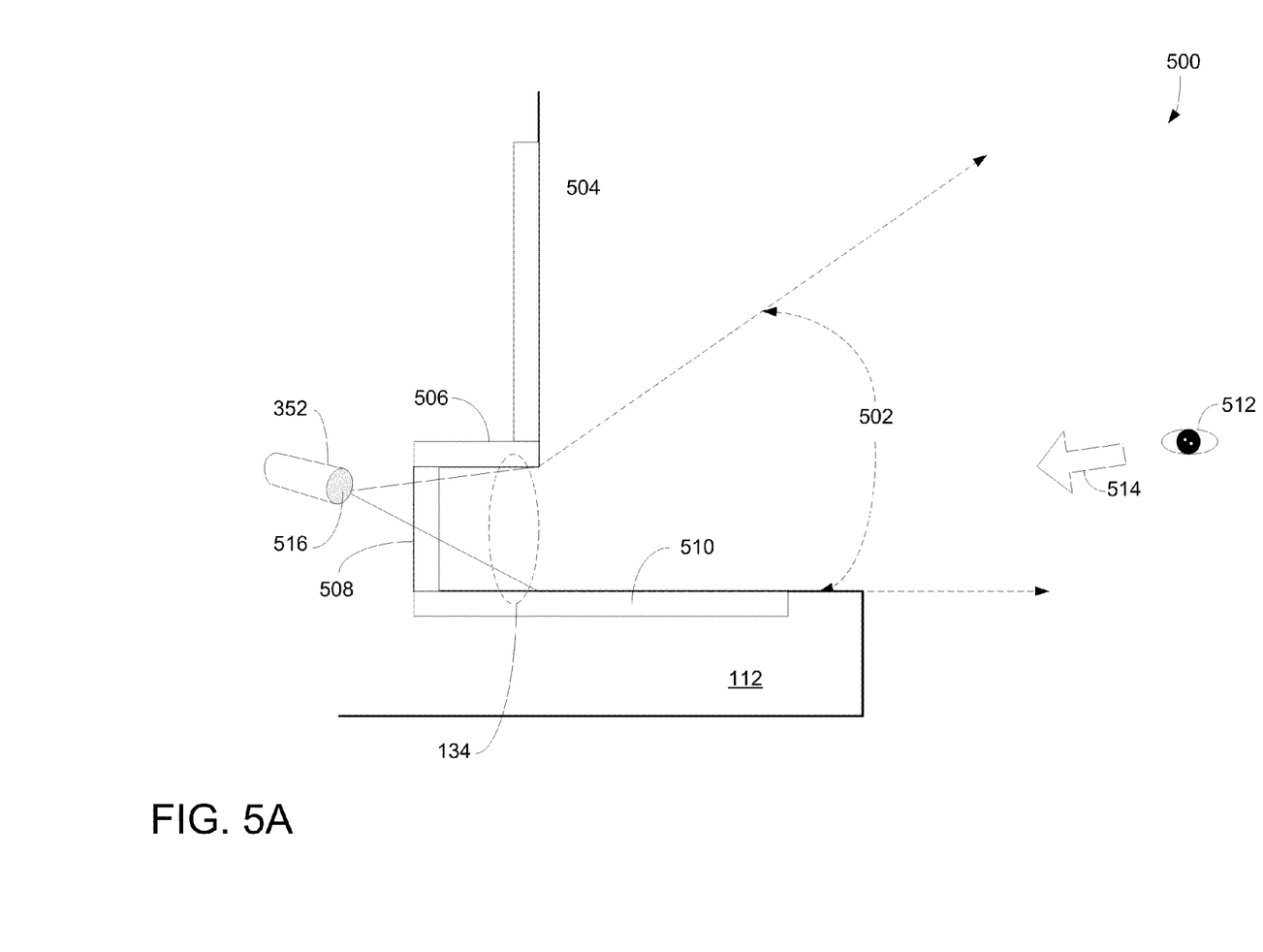
FIG. 5AB are cross-section diagrams showing sectional views of a device using wide angle viewing orientations in accordance with one embodiment of the present invention.

FIG. 5A is a cross-section diagram 500 showing sectional views of a device using wide angle viewing orientations in accordance with one embodiment of the present invention. Diagram 500 includes optical channel 134, light source 352, and a viewing angle 502. Depending on the applications, various different optical materials may be used to make graphic view surfaces 504, 510, light mask 508, and upper side 506. Note that upper side 506 and graphic viewing surface 510 form optical channel 134 which is at least partially responsible to collimate optical light viewable from a direction indicated by arrow 514. When a user 512 looks at direction 514, user 512 can see device performance and/or status by viewing the diffused illumination(s) associated with indicator(s) with viewing angle 502. The range of viewing angle 502 can change depending on the position of light source 352, lens 516, channel 134, as well as optical materials used.

Figure 5B:
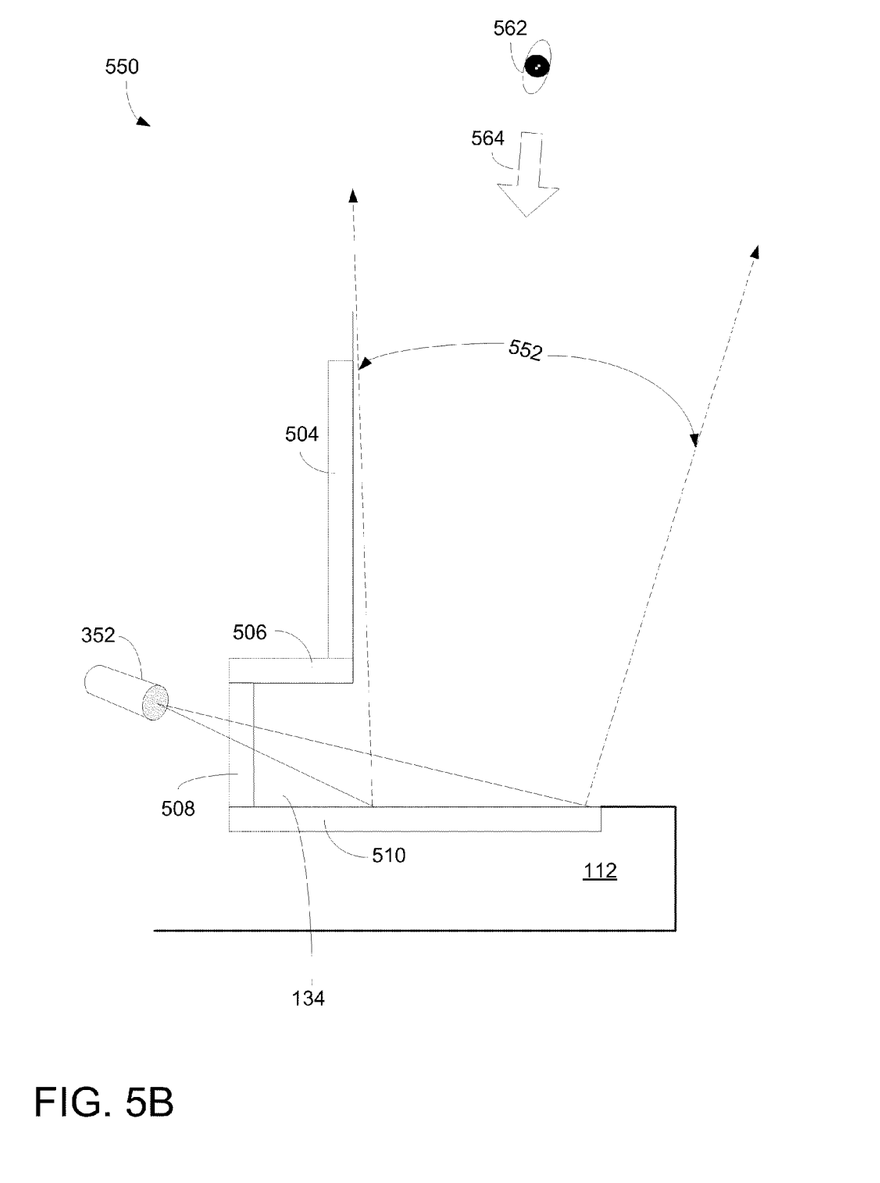

FIG. 5B is a cross-section diagram 550 showing sectional views of device layout having wide angle viewing orientations in accordance with one embodiment of the present invention. Diagram 550 includes optical channel 134, light source 352, and a viewing angle 552. The position of light source 352 and materials used for graphic viewing surface 510 determines the range of viewable angle 552. When a user 562 looks at direction 564, user 562 can view device performance by observing diffused illuminations associated with indicator(s) with viewing angle 552. The range of viewing angle 552 can change depending on the position of light source 352, lens 516, channel 134, as well as optical materials used in the device.

When viewing angles 502 and 552 overlap, a user has a 90-degree viewable angle to monitor device status. It should be noted that the viewable angle can be greater than 90 degree angle. In one embodiment, the combination of angles 502 and 552 is a wide viewing angle.

In one example, a system for network communication has a first graphic viewing surface, a second graphic viewing surface, and an LED. The first graphic viewing surface has first printed icons describing functional indicators and the second graphic viewing surface has second printed icons describing functional indicators. The first and second graphic viewing surfaces are situated at a predefined angle. The LED provides a first diffused illumination area and a second diffused illumination area. The first diffused illumination area illuminates a portion of the first graphic viewing surface to indicate a first device performance and the second diffused illumination area illuminates a portion of the second graphic viewing surface to indicate a second device performance. The first device performance and the second device performance can indicate substantially the same device performance. The system may further include an optical guiding channel capable of guiding optical beams to create the first and the second diffused illumination areas. The optical guiding channel, in one aspect, creates a groove between the first graphic viewing surface and the second graphic viewing surface. The predefined angle may include a range from 20 degrees to 170 degrees.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
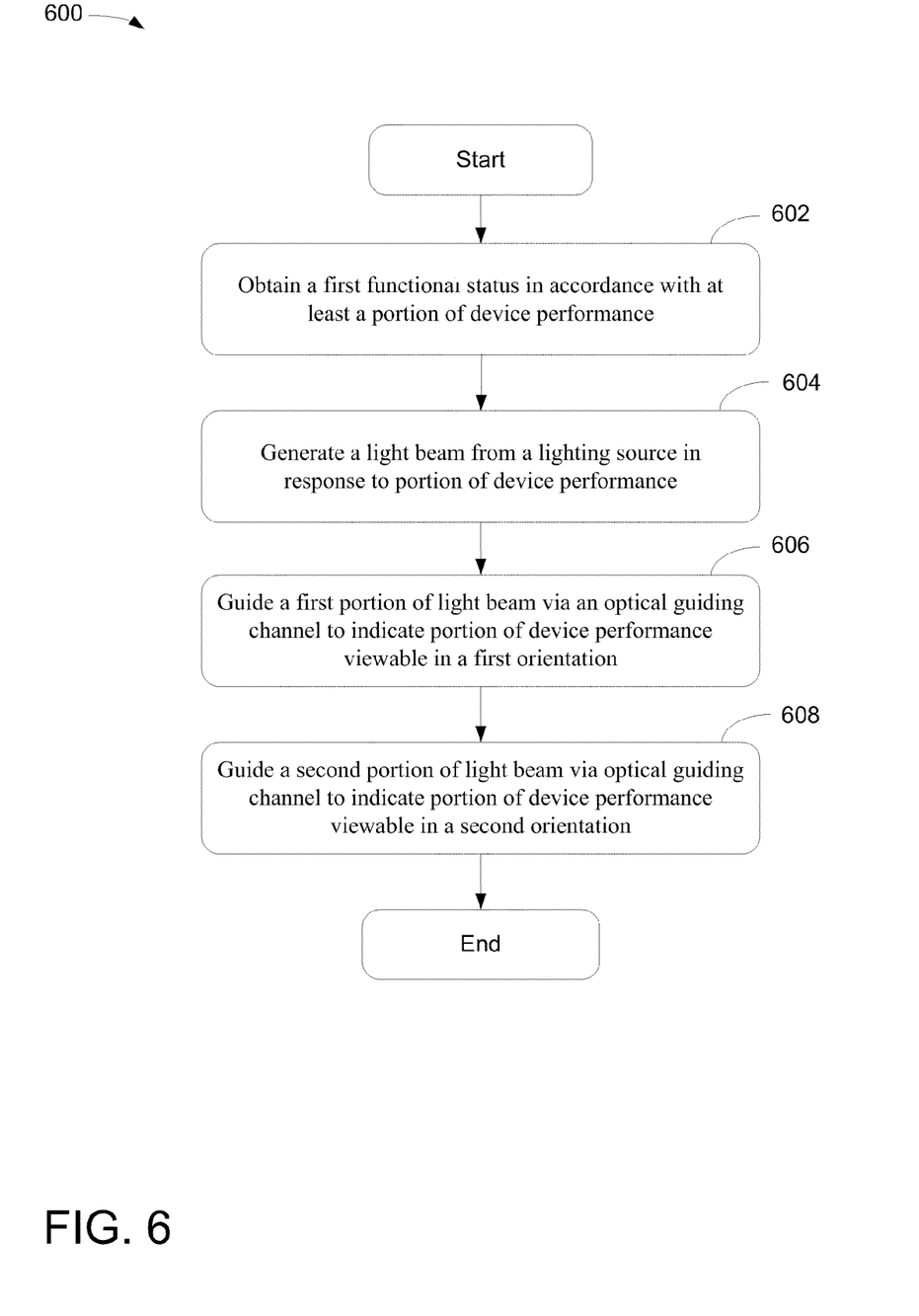
FIG. 6 is a flowchart illustrating a process of providing a wide angle viewing orientation in accordance with one embodiment of the present invention.
Figure 7:
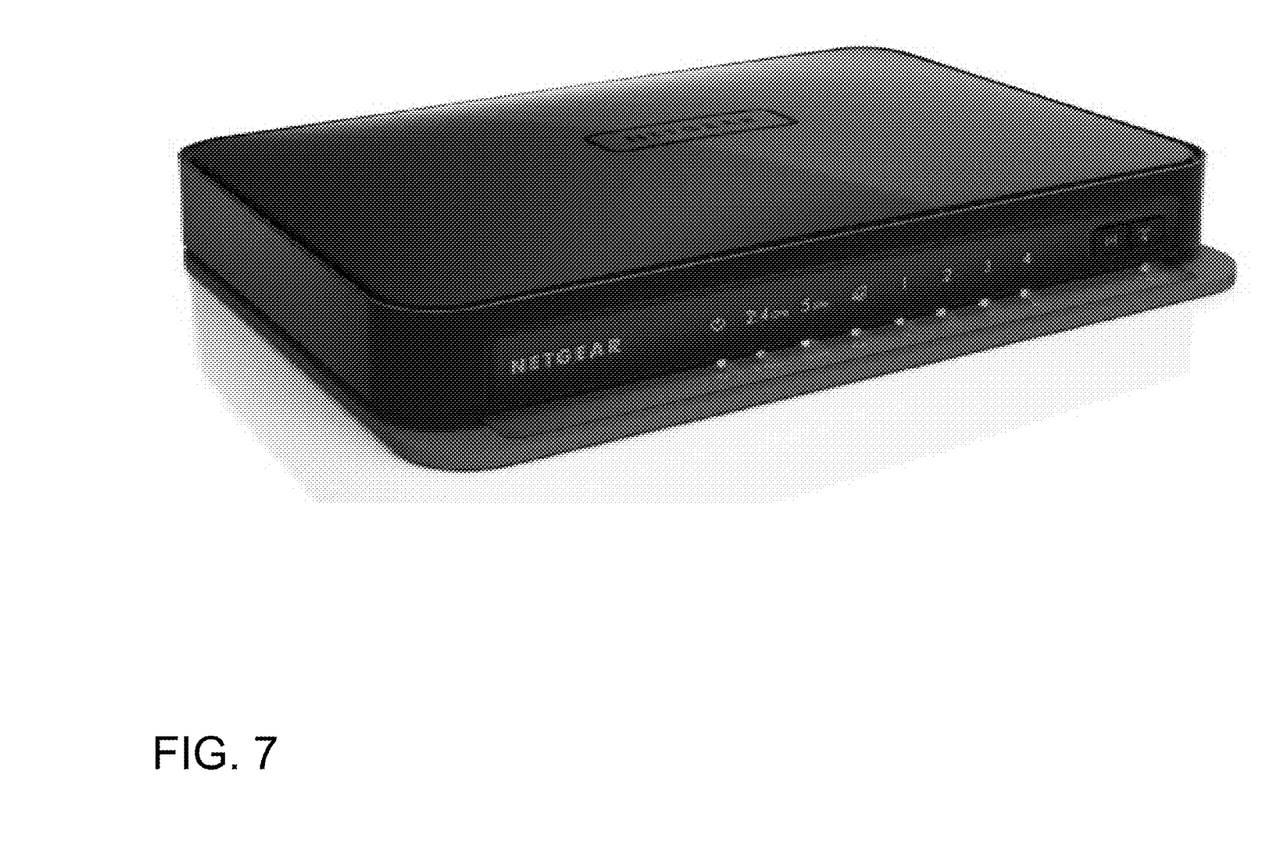
FIG. 7 illustrates a perspective view of a device layout capable of providing wide angle viewing orientation in accordance with one embodiment of the present invention.
Figure 8:
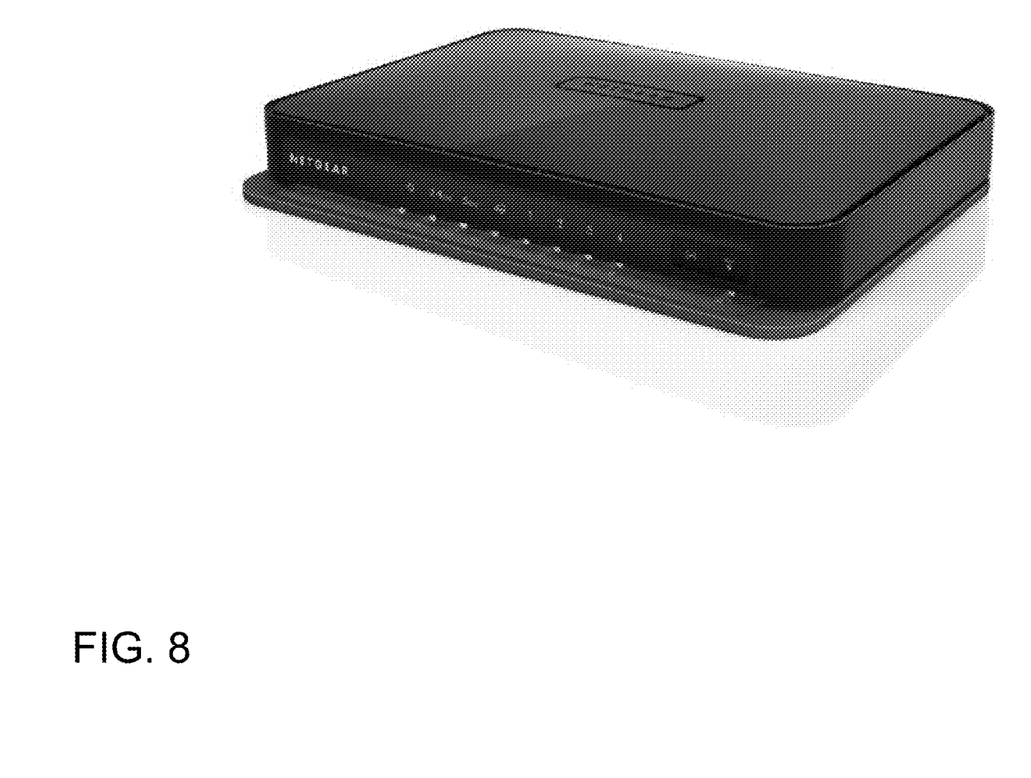
FIG. 8 illustrates another perspective view of a device layout capable of providing wide angle viewing orientation in accordance with one embodiment of the present invention.
Figure 9:
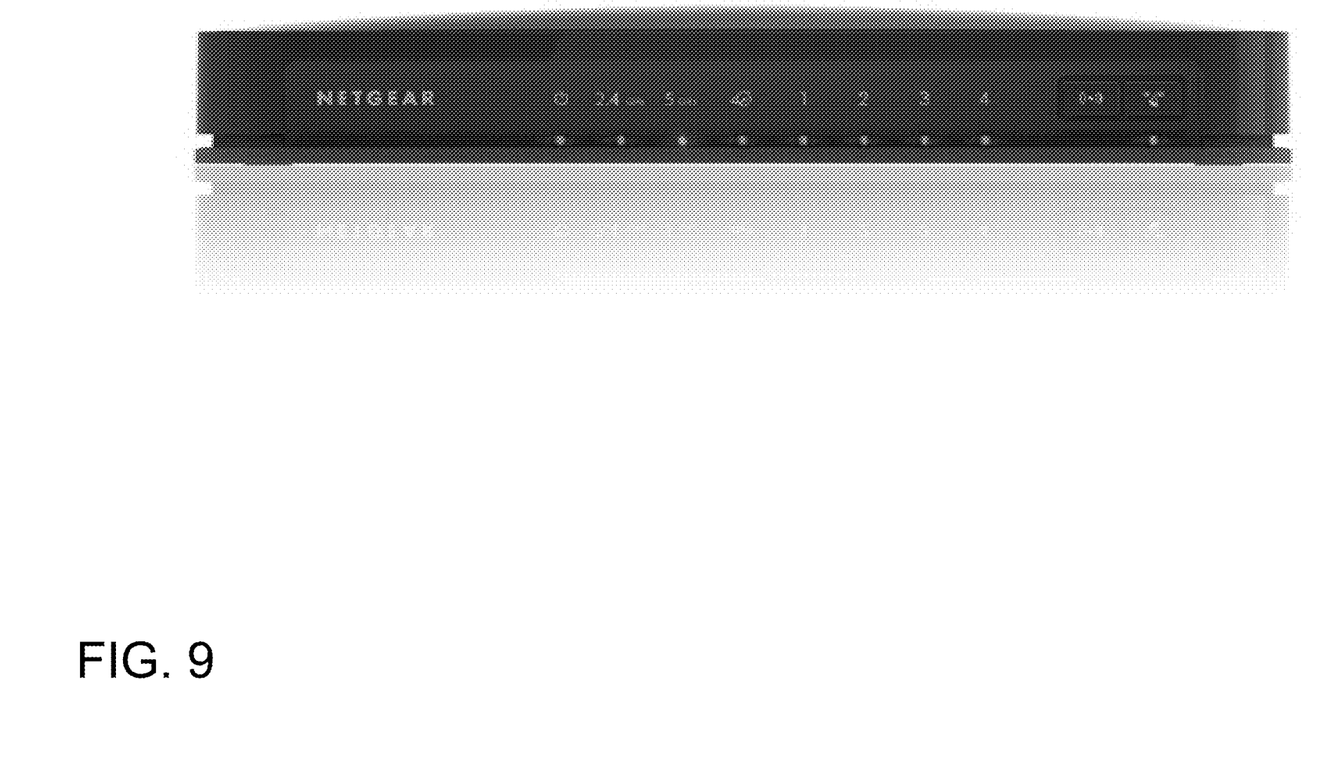
FIG. 9 illustrates a front view of a device layout capable of providing wide angle viewing orientation in accordance with one embodiment of the present invention.
Figure 10:
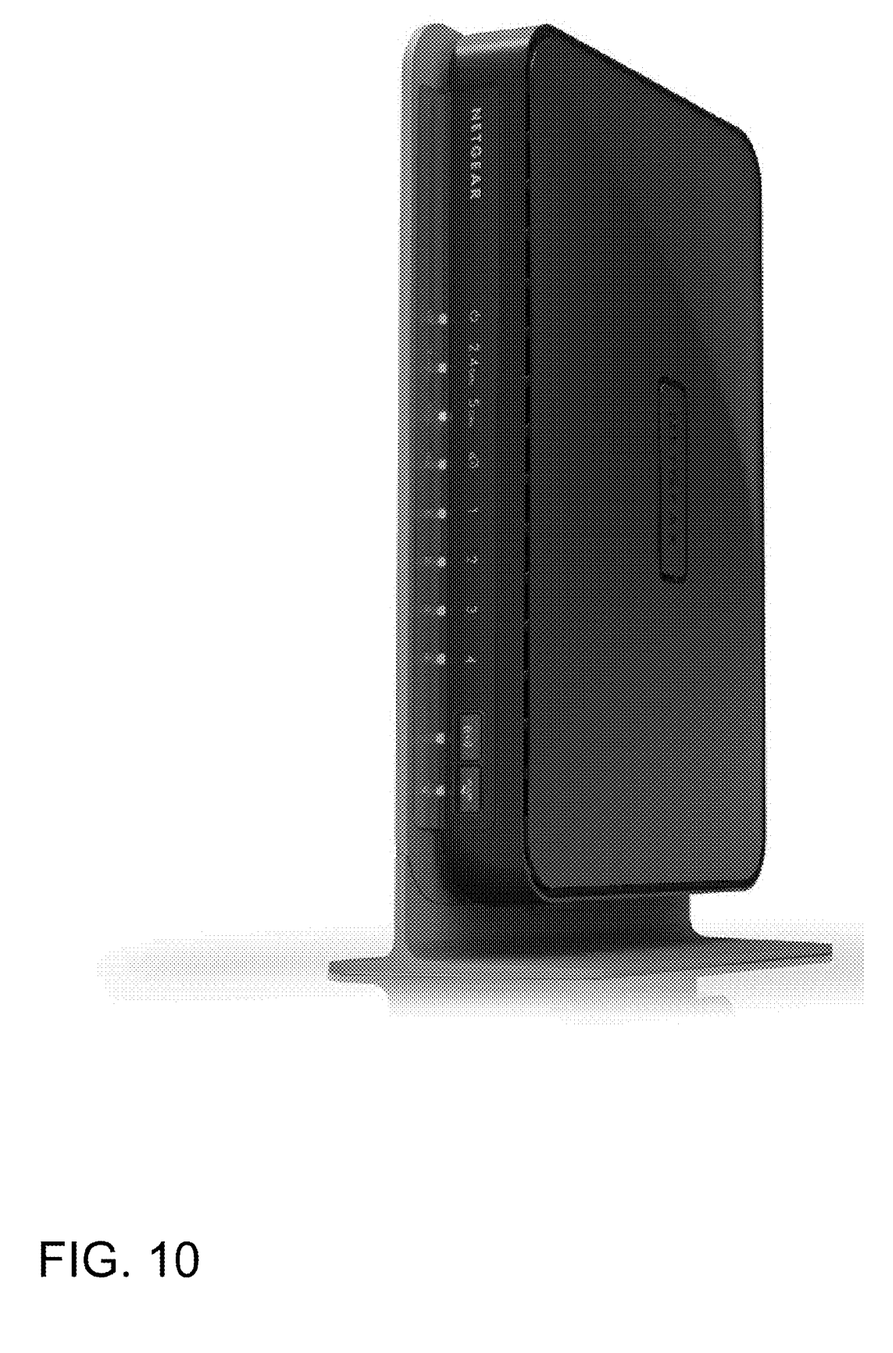
FIG. 10 illustrates a standing view of a device layout capable of providing wide angle viewing orientation in accordance with one embodiment of the present invention.

FIG. 6 is a flowchart 600 illustrating a process of providing a wide angle viewing orientation in accordance with one embodiment of the present invention. At block 602, a network process obtains a first functional status in accordance with at least a portion of device performance. For example, the process is capable of identifying a signal indicating bandwidth of communication.

At block 604, the process generates a light beam from a light source in response to the portion of device performance. For example, a section of a graphic viewing surface in accordance with the portion of device performance is subsequently illuminated.

At block 606, the process is capable of guiding a first portion of the light beam via an optical guiding channel to indicate the portion of device performance viewable in a first orientation. The process directs or forwards sufficient portion of light beam to form a first diffused illumination area in a first direction.

At block 608, the process guides a second portion of the light beam via the optical guiding channel to indicate the portion of device performance viewable in a second orientation. The process is capable of directing sufficient portion of light beam to form a second diffused illumination area in a second direction.

FIGS. 7-10 illustrate a set of 3D device layouts capable of enhancing the capability of status monitoring using wide angle viewing orientations in accordance with one embodiment of the present invention.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A system for network communication, comprising: a first graphic viewing surface having a plurality of first printed icons describing functional indicators; a second graphic viewing surface having a plurality of second printed icons describing functional indicators and coupled to the first graphic viewing surface with a predefined angle; and a light emitting diode ("LED") coupled to the first graphic viewing surface and configured to provide a first diffused illumination area and a second diffused illumination area;

wherein the first diffused illumination area illuminates a portion of the first graphic viewing surface to indicate a first device performance; and wherein the second diffused illumination area illuminates a portion of the second graphic view surface to indicate a second device performance; wherein the first device performance and the second device performance indicate substantially same device performance; wherein the predefined angle is substantially 90 degree between a surface of the first plate and a surface of the second plate.

2. The system of claim 1, further comprising an optical guiding channel coupled with the first graphic viewing surface and capable of guiding optical beams to create the first and the second diffused illumination areas.

3. The system of claim 2, wherein the optical guiding channel creates a groove between the first graphic viewing surface and the second graphic viewing surface.

4. The network device of claim 1, wherein the predefined angle includes a range from 20 degree to 170 degree.

* * * * *